June 25, 1929.  J. E. MEADOWS  1,718,868
DENTAL APPLIANCE
Filed March 7, 1928
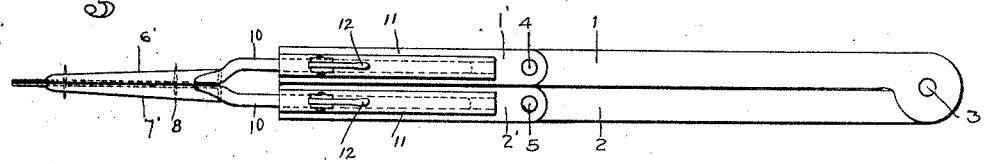
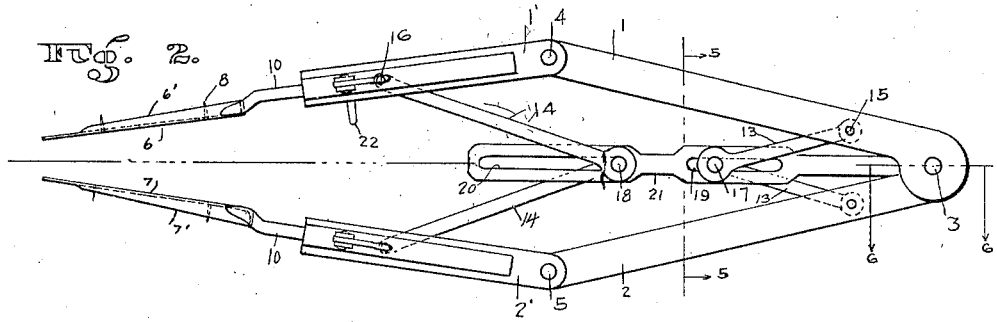
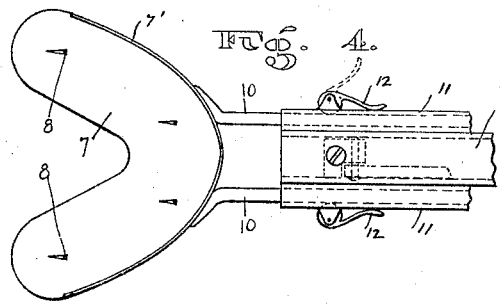 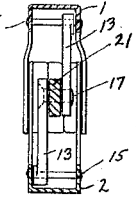 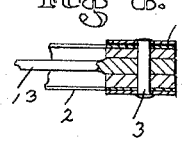
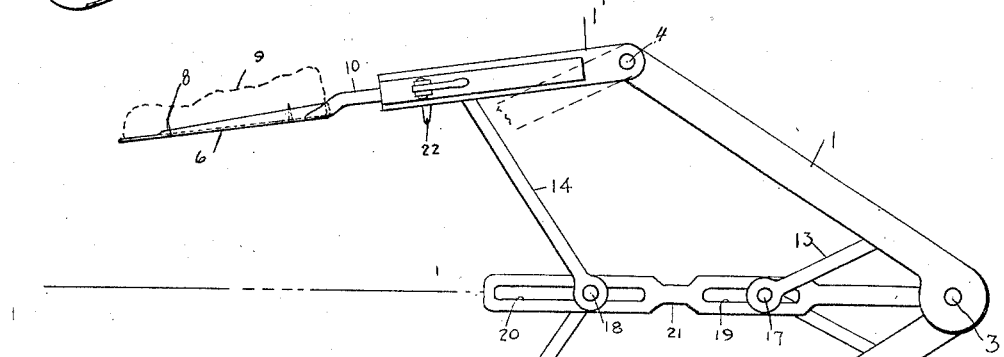
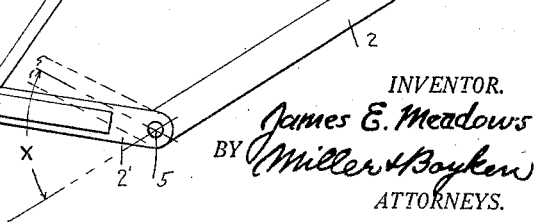
INVENTOR.
James E. Meadows
BY Miller & Boyken
ATTORNEYS.

Patented June 25, 1929.

1,718,868

UNITED STATES PATENT OFFICE.

JAMES E. MEADOWS, OF SAN FRANCISCO, CALIFORNIA.

DENTAL APPLIANCE.

Application filed March 7, 1928. Serial No. 259,679.

This invention relates to appliances used by dentists in the making of sets of artificial teeth and the object of the invention is to provide an appliance for establishing centric relation and centric occlusion in all dental restorations, or, in other words, means by which the proper "bite" or normal relation of a patient's jaws may be transferred to the dental articulator so that the set of teeth made will have exactly the same relation or "bite" when finally in the patient's mouth.

Briefly described, the appliance comprises a pair of pivoted arms composed of a plurality of joints and controlled with links so that corresponding members of both arms must operate simultaneously at all points from the closed to the open position. The ends of the arms provided with biting plates or trays; one for the lower and one for the upper jaw; adapted to carry the impression wax, and the trays arranged for relative sliding action and provided with means for locking in the position of sliding, all so that wax carried by the trays may be bitten upon and the mouth opened wide and trays separated to keep their positions relative to their respective jaws yet slidably adjustable relative to one another as mentioned, so that after locking the trays to relative positions when mouth is wide open, then removing the appliance with wax impressions and closing the appliance, the correct bite of the jaws will be had or registered by the appliance.

In the drawings Fig. 1 is a side elevation of the appliance with the arms closed and the biting trays brought flat together.

Fig. 2 is a similar view to Fig. 1 but showing the appliance partially open.

Fig. 3 shows the device still further open, or in about the position if in a patient's mouth fully open.

Fig. 4 is a plan view of the lower jaw tray and portion of the lower arm.

Fig. 5 is a cross section of Fig. 2 as seen from the line 5—5 thereof.

Fig. 6 is a longitudinal section as seen from the line 6—6 of Fig. 2.

In further detail the upper arm 1 is pivoted to the lower arm 2 at 3 and at the forward ends of the arms are respectively shorter sections 1' and 2' pivoted at 4 and 5 respectively to the rear or main arm sections 1 and 2.

At the extreme forward ends of the short sections of the arms are the biting trays. These trays are of thin metal and are preferably alike though in the drawing they are designated 6 for the upper jaw tray and 7 for the lower jaw tray. These trays are U-shaped and each tray has a low rim 6'—7' respectively extending about its outer edge, and preferably a plurality of short spines 8 are struck up from the outer surfaces of the plates or otherwise formed thereon so as to provide means for holding a layer or layers of impression wax thereon, such for instance as indicated by the dotted lines 9 in Fig. 3.

The trays are each provided with two shanks 10 freely slidable in sockets 11 in the end sections of the arms and which shanks may be clamped at any position of sliding by small cam levers 12 or their equivalents.

The reason for providing two shanks on each tray is to hold them from turning, so that they will lie flat together when the arms are closed, and any single shank so shaped as to prevent turning or twisting of the trays may be substituted for the double shanks.

The arms are of light metal preferably of channel form as indicated and are controlled for simultaneous operation of their corresponding parts by means of links 13 and 14 transversely pivoted to the rear and forward sections respectively of the arms at 15 and 16 and to each other at 17 and 18 while at the same time slidable at 17 and 18 in slots 19 and 20 in a central guiding arm 21 in turn pivoted at its rear end on the main arm pivot 3.

The arrangement of links and guiding arm is such that all fold within the two confronting channels of the arms when the appliance is in closed position as shown in Fig. 1 and when opened to any degree the links will operate in a manner to make the sections of both arms act simultaneously at opposite sides of a center line extending through the guiding arm 21.

When the appliance is open the forward sections 1' and 2' of the arms may be swung at any desired position within the angle X indicated in Fig. 3, and the hinge joints at 4 and 5 are preferably so constructed as to limit the outward swinging of the arm sections 1'—2' to flush relation with the main or rear sections 1—2.

To insure alignment of the arms when closed, an aligning lug is preferably provided as indicated at 22.

To operate my appliance I proceed as follows:—

Insert the bite trays in the appliance with the flat surfaces of the trays together.

Where the bite is to be taken and wax bite blocks have previously been prepared place bite blocks in the patient's mouth, and with the appliance closed place the bite trays in the mouth so that the rims of the trays are outside of the bite rims. Have the appliance pointing in front of the median line as near as possible.

Now have the patient close the mouth with the bite blocks firm against the bite trays. Loosen the cam lever on the lower bite tray and instruct the patient to open the mouth as wide as possible and at the same time the operator holds the bite trays and blocks against their respective ridges.

While the patient's mouth is in the wide open position hold the bite trays and blocks in position with one hand and with the other clamp the levers of the lower bite tray.

If the patient did not give the correct "bite" when closing on the bite trays, the lower tray will pull out of the appliance and adjust itself to the correct "bite" relation. Remove the appliance from the mouth with bite block and trays attached. Now close the arms together and seal the bite trays together with base plate or sticky wax. Loosen the clamping levers of both bite trays and remove them from instrument while stuck together and mount the case on the articulator in the usual way.

In an edentulous case where bite blocks are not used and a "mush" or "biscuit" bite is desired, soften and knead two and one-half sheets of base plate wax for each bite tray. Place the soft wax on each bite tray and close the arms. Place the bite trays with wax attached in the patient's mouth and have the patient close as in an ordinary "mush" or "biscuit" bite.

Release clamps of the lower bite tray and have the patient open the mouth as wide as possible and proceed the same as when bite blocks are used.

To take the "bite" with the natural teeth in position place one inch of soft wax on each bite tray and have the patient bite into the wax with the bite trays closed and proceed as when bite blocks are used.

In partial cases any combination of the bite blocks, "mush" and "biscuit" bite and the one inch thickness of soft wax may be used.

Having thus described my invention and explained its mode of operation and use I claim:—

1. A dental appliance comprising a pair of arms pivotally connected at one end whereby to open and close compass-like, and a pair of mouth trays removably mounted on the opposite ends of said arms, means whereby one of said trays is adjustable longitudinally of the arm on which it is mounted independent of the pivotal connection.

2. A dental appliance comprising a pair of arms pivotally connected at one end whereby to open and close compass-like, and a pair of mouth trays removably mounted on the opposite ends of said arms, means whereby one of said trays is adjustable longitudinally of the arm on which it is mounted independent of the pivotal connection and means for locking the adjustable tray in position.

3. A dental appliance comprising a pair of arms pivotally connected at one end, and a pair of mouth trays removably mounted on the opposite ends of said arms, means whereby said arms are controlled for simultaneous pivotal movement.

4. A dental appliance comprising a pair of arms pivotally connected at one end, and a pair of mouth trays removably mounted on the opposite ends of said arms, said arms comprising each a plurality of sections pivoted to one another, and means whereby all of the arm sections are controlled for simultaneous pivotal movement.

5. A dental appliance comprising a pair of arms pivotally connected at one end, and a pair of mouth trays removably mounted on the opposite ends of said arms, said arms comprising confronting channels, and links pivoted within said channels arranged to control said arms for simultaneous movement in opening and closing the arms.

6. A dental appliance comprising a pair of arms pivotally connected at one end, and a pair of mouth trays removably mounted on the opposite ends of said arms, said arms comprising each a plurality of sections pivoted to one another so as to all swing in one plane toward opening and closing of the arms, a guiding arm pivoted to the arms at their pivotally connected end, links pivoted respectively at their outer ends at opposite points to the arm sections and slidably and pivotally mounted at their inner ends on said guiding arm whereby the pivotal swinging of the arm sections is simultaneously controlled.

7. In a structure as specified in claim 6 means for definitely aligning said arms in closed position.

8. In a structure as specified in claim 6 said arms being of channel form arranged in confronting relation, and said guiding arm and links arranged to lie within the channels when the arms are closed together.

JAMES E. MEADOWS.